UNITED STATES PATENT OFFICE.

JOHN A. JUST, OF SYRACUSE, NEW YORK, ASSIGNOR TO THE ASPHALTINA COMPANY OF AMERICA, OF SAME PLACE.

PAVING OR ROOFING COMPOSITION AND METHOD OF MAKING SAME.

SPECIFICATION forming part of Letters Patent No. 540,793, dated June 11, 1895.

Application filed March 13, 1895. Serial No. 541,602. (No specimens.)

*To all whom it may concern:*

Be it known that I, JOHN A. JUST, a citizen of the United States, residing at Syracuse, in the county of Onondaga and State of New York, have invented a new or useful Improvement in Paving or Roofing Compositions and Methods of Making Same, of which the following is a specification.

This invention relates to that class of compositions of matter which are used in connection with finely divided mineral matter in the construction of pavements, roofs, tiles, drain pipes, electric subways, &c., and has for its object the production of a hard and tenacious composition which is particularly suitable for the manufacture of tiles, pipes, &c., and which has such a high melting point that it can be used in connection with natural or artificial asphalt for raising the melting point of the asphalt or asphalt substitute with which it is mixed.

In practicing this invention I mix about thirty-five parts of calcium resinate, twenty-five parts of rosin, ten parts of a heavy hydro-carbon, and thirty parts of sulphurized tar containing about one part of sulphur to seventeen parts of tar, and heat this mixture to a temperature of from 400° to 500° Fahrenheit for a sufficient length of time to form a homogeneous substance. The calcium resinate and the rosin are melted for adding the heavy hydro-carbon and the sulphurized tar thereto.

The calcium resinate is prepared, preferably, by melting the rosin and adding thereto caustic or hydrated lime in the proportion of eight parts of lime to twenty-eight parts of rosin. When the chemical action has ceased I add to the calcium resinate the above mentioned proportion of free rosin. The latter acts as a solvent for the resinate and lowers the melting point of the product and I prefer to use free rosin for that purpose but it may be omitted. Instead of forming the calcium resinate and then adding free rosin thereto, the entire quantity of rosin may be melted at once and the lime be added in such proportion as to form about thirty-five parts of calcium resinate and leave about twenty-five parts of rosin uncombined with lime.

As a heavy hydro-carbon I prefer the petroleum sediment known as "B. S." This is preferably heated before adding it to the other ingredients for the purpose of freeing it from water.

The tar is heated with the above mentioned proportion of sulphur so as to affect a thorough action of the sulphur upon the tar.

The product is a hard tenacious substance which has a high melting point and withstands the action of steam and hot water without softening. It can be used with great advantage for admixture with natural or artificial asphalt to raise the melting point thereof. It is also very suitable for the manufacture of pipes, tiles, &c., by mixing from seventeen to twenty-five parts of this composition with from eighty-three to seventy-five parts of sand or other finely divided mineral matter.

I claim as my invention—

1. The herein described composition of matter consisting of a calcium resinate, a heavy hydrocarbon, tar and sulphur, substantially as set forth.

2. The herein described composition of matter consisting of calcium resinate, rosin, a heavy hydro-carbon, tar and sulphur, substantially as set forth.

3. The herein described method of producing a composition of matter which consists in forming a solution of calcium resinate in free rosin, adding thereto a heavy hydro-carbon and sulphurized tar, and heating the mixture, substantially as set forth.

Witness my hand this 8th day of March, 1895.

JOHN A. JUST.

Witnesses:
JULIE R. JENNEY,
EDWARD WILHELM.